(12) United States Patent
O'Sullivan et al.

(10) Patent No.: US 10,363,614 B2
(45) Date of Patent: Jul. 30, 2019

(54) LASER LEVEL, BATTERY PACK AND SYSTEM

(71) Applicant: STANLEY BLACK & DECKER INC., New Britain, CT (US)

(72) Inventors: Noreen M. O'Sullivan, Newington, CT (US); Spencer P. Maheu, Richmond, IN (US); Jiang Jia Yong, Suzhou (CN); James Spaulding, Bristol, CT (US)

(73) Assignee: Stanley Black & Decker Inc., New Britain, CT (US)

( * ) Notice: Subject to any disclaimer, the term of this patent is extended or adjusted under 35 U.S.C. 154(b) by 444 days.

(21) Appl. No.: 15/054,298

(22) Filed: Feb. 26, 2016

(65) Prior Publication Data

US 2016/0293909 A1   Oct. 6, 2016

Related U.S. Application Data

(60) Provisional application No. 62/142,224, filed on Apr. 2, 2015.

(51) Int. Cl.
*B25F 5/02* (2006.01)
*B25H 1/00* (2006.01)
(Continued)

(52) U.S. Cl.
CPC .............. *B23B 49/00* (2013.01); *B25F 5/021* (2013.01); *B25H 1/0092* (2013.01);
(Continued)

(58) Field of Classification Search
CPC .............. B23B 49/00; B23B 2260/024; B23B 2260/092; B25F 5/021; B25H 1/0092; H01M 16/00; Y10T 408/21
See application file for complete search history.

(56) References Cited

U.S. PATENT DOCUMENTS

| | | |
|---|---|---|
| 4,399,201 A | 8/1983 | Nagahara |
| 4,751,452 A | 6/1988 | Kilmer et al. |
| | (Continued) | |

FOREIGN PATENT DOCUMENTS

| | | |
|---|---|---|
| DE | 202015004274 | 9/2015 |
| EP | 1235051 | 8/2002 |

OTHER PUBLICATIONS

Bosch Press Release dated Oct. 14, 2014 regarding The Bosch D-tect 120 Professional for professionals radar detector.
(Continued)

*Primary Examiner* — Eric A Gates
(74) *Attorney, Agent, or Firm* — Stephen R. Valancius

(57) ABSTRACT

A laser level including a housing. At least one laser generator supported by the housing and configured to emit at least one laser beam. A battery receiving portion configured to selectively receive a first battery pack and a second battery pack, the first and second battery packs providing power for the laser generator when received in the battery receiving portion. The first battery pack is configured to be coupleable to at least one of a drill, a saw and a sander. The second battery pack is configured to be blocked from coupling from the at least one of the drill, the saw and the sander to which the first battery pack is coupleable.

13 Claims, 13 Drawing Sheets

(51) Int. Cl.
  *H01M 2/10*     (2006.01)
  *B23B 49/00*    (2006.01)
  *H01M 10/24*    (2006.01)
  *H01M 16/00*    (2006.01)
  *H01M 10/0525*  (2010.01)

(52) U.S. Cl.
  CPC ......... *H01M 2/1022* (2013.01); *H01M 16/00* (2013.01); *B23B 2260/024* (2013.01); *B23B 2260/092* (2013.01); *B23B 2260/094* (2013.01); *H01M 10/0525* (2013.01); *H01M 10/24* (2013.01); *H01M 2220/30* (2013.01); *Y10T 408/21* (2015.01)

(56) References Cited

U.S. PATENT DOCUMENTS

| | | | | |
|---|---|---|---|---|
| 5,144,217 | A * | 9/1992 | Gardner | H01M 2/1055 320/110 |
| 5,485,073 | A | 1/1996 | Kasahima et al. | |
| 5,505,000 | A | 4/1996 | Cooke | |
| 5,508,123 | A | 4/1996 | Fan | |
| 5,661,392 | A | 8/1997 | Imazeki | |
| 6,161,938 | A | 12/2000 | Kish et al. | |
| 6,329,788 | B1 * | 12/2001 | Bailey, Jr. | B25F 5/02 307/43 |
| 6,346,793 | B1 * | 2/2002 | Shibata | H02J 7/0042 320/107 |
| 6,437,536 | B2 | 8/2002 | Higuchi | |
| 6,505,952 | B1 | 1/2003 | Kish et al. | |
| 6,898,860 | B2 * | 5/2005 | Wu | B25H 1/0092 33/286 |
| 7,296,360 | B2 | 11/2007 | El-Katcha et al. | |
| 7,481,002 | B2 | 1/2009 | Bascom et al. | |
| 8,189,043 | B2 | 5/2012 | Schneider et al. | |
| 8,307,562 | B2 | 11/2012 | Bascom et al. | |
| 8,384,340 | B2 | 2/2013 | Tarter | |
| 8,409,748 | B2 | 4/2013 | Hagiwara et al. | |
| 8,659,652 | B2 | 2/2014 | Schneider et al. | |
| 9,808,246 | B2 * | 11/2017 | Shelton, IV | A61B 17/068 |
| 2003/0151914 | A1 | 8/2003 | Kish et al. | |
| 2006/0176682 | A1 * | 8/2006 | Wu | B25H 1/0092 362/119 |
| 2009/0202896 | A1 | 8/2009 | Rejman | |
| 2010/0065295 | A1 | 3/2010 | Aradachi et al. | |
| 2011/0197389 | A1 * | 8/2011 | Ota | B25F 5/00 15/339 |
| 2013/0115498 | A1 | 5/2013 | Kondo et al. | |
| 2013/0177796 | A1 | 7/2013 | Kondo | |
| 2014/0111595 | A1 | 4/2014 | Vetterling et al. | |
| 2014/0112695 | A1 | 4/2014 | van Dijik et al. | |
| 2014/0160268 | A1 | 6/2014 | Schneider et al. | |
| 2014/0332243 | A1 | 11/2014 | Baskar et al. | |
| 2015/0188270 | A1 * | 7/2015 | Knight | H01R 27/00 439/350 |
| 2016/0372939 | A1 | 12/2016 | Roehm et al. | |
| 2017/0003129 | A1 | 1/2017 | Ishikawa et al. | |

OTHER PUBLICATIONS

Website for Bosch D-Tect 120 wall scanner. Product believed to be prior art. https://www.boschtools.com/us/en/boschtools-ocs/stud-finders-d-tect-120-119825-p/ ; accessed on Aug. 3, 2018.

Manual for Bosch-D-Tect-120 professional wall scanner. Manual dated Sep. 19, 2014. Accessed from https://manualszoom.com/manuals/do-it-yourself/wall-scanners/bosch/bosch-d-tect-120-professional-wall-scanner.html accessed on Aug. 3, 2018.

Webpage with video of Bosch-D-Tect-120 professional wall scanner dated Mar. 20, 2015 https://www.youtube.com/watch?v=40DtX3bzeek ; accessed on Aug. 3, 2018.

Kobalt Hypercoil LED flashlight review published Oct. 31, 2013, website accessed Feb. 18, 2019: https://toolguyd.com/kobalt-hypercoil-led-flashlight-review/.

Amazon webpage for Kobalt Hypercoil LED flashlight, lists date first available as Nov. 28, 2013, website accessed Feb. 18, 2019: https://www.amazon.com/Kobalt-Hypercoil-Light-63453-kobalt/dp/B018A32BJG.

Bosch BAT 414 12V Li-ion battery, website accessedFeb. 18, 2019, https://www.boschtools.com/us/en/boschtools-ocs/batteries-chargers-starter-kits-bat414-46530-p/.

Amazon webpage for Bosch BAT 414 12V Li-ion battery, lists date first available as Jan. 25, 2013, website accessed Feb. 18, 2019: https://www.amazon.com/Bosch-BAT414-12-Volt-Lithium-Ion-Capacity/dp/B00B7EU1E8.

* cited by examiner

LASER LEVEL, BATTERY PACK AND SYSTEM

CROSS-REFERENCE TO RELATED APPLICATIONS

This application claims the benefit of U.S. Provisional Application No. 62/142,224, filed on Apr. 2, 2015, entitled Laser Level Battery Pack and System. The entire disclosures of the above application are incorporated herein by reference.

FIELD OF THE INVENTION

The present invention relates to a laser level, battery pack and system.

BACKGROUND

A laser level is typically powered by a battery. It may be desirable to provide a laser level that can alternatively be powered by a dedicated battery pack or by a power pack that is also coupleable to a power tool such as a drill, saw or sander and can also power those devices. Accordingly, it is an object of the invention to provide a laser level, battery pack and system.

SUMMARY

According to one exemplary embodiment, there is a laser level including a housing. At least one laser generator is supported by the housing and configured to emit at least one laser beam. A battery receiving portion is configured to selectively receive a first battery pack and a second battery pack, the first and second battery packs providing power for the laser generator when received in the battery receiving portion. The first battery pack is configured to be coupleable to at least one of a drill, a saw and a sander; and the second battery pack is configured to be blocked from coupling from the at least one of the drill, the saw and the sander to which the first battery pack is coupleable.

The first battery pack may be configured to be coupleable to a drill and wherein the second battery pack is configured to be blocked from coupling with the drill.

The second battery pack may include a blocking member which prevents it from being coupled with the drill.

The blocking member may include a projection.

The first battery pack may include battery cells with a first battery chemistry and the second battery pack includes battery cells with a second battery chemistry, different than the first battery chemistry.

The battery cells of the second battery pack may be removable.

The battery cells of the first battery pack may be rechargeable.

The first battery pack may provide power at a first voltage and wherein the second battery pack provides power at a second voltage, different than the first voltage.

According to another aspect of an exemplary embodiment, there is a powered tool system including a first powered tool configured to be selectively coupleable to and powered by a first battery pack and a second battery pack, the first battery pack including a first battery cell of a first type and the second battery pack including a second battery cell of a second type. A second powered tool is configured to be selectively coupleable to and powered by the first battery pack. The second battery pack is not selectively coupleable to the second powered to so as to power the second powered tool.

The first powered tool may include a laser configured to project at least one of a dot and a beam on a remote surface.

The second powered tool may include at least one of a drill, an impact driver, a sander and a saw.

The first battery cell may include a battery cell with a lithium-ion chemistry;

The second battery cell may include an alkaline battery cell.

The second battery pack may include a blocking member which prevents it from being coupled with the drill.

The blocking member may include a projection.

The first battery pack may include battery cells with a first battery chemistry and the second battery pack includes battery cells with a second battery chemistry, different than the first battery chemistry.

The battery cells of the second battery pack may be removable.

The battery cells of the first battery pack may be rechargeable.

The first battery pack may provide power at a first voltage and wherein the second battery pack provides power at a second voltage, different than the first voltage.

DETAILED DESCRIPTION OF EXEMPLARY EMBODIMENTS

Figure 8:
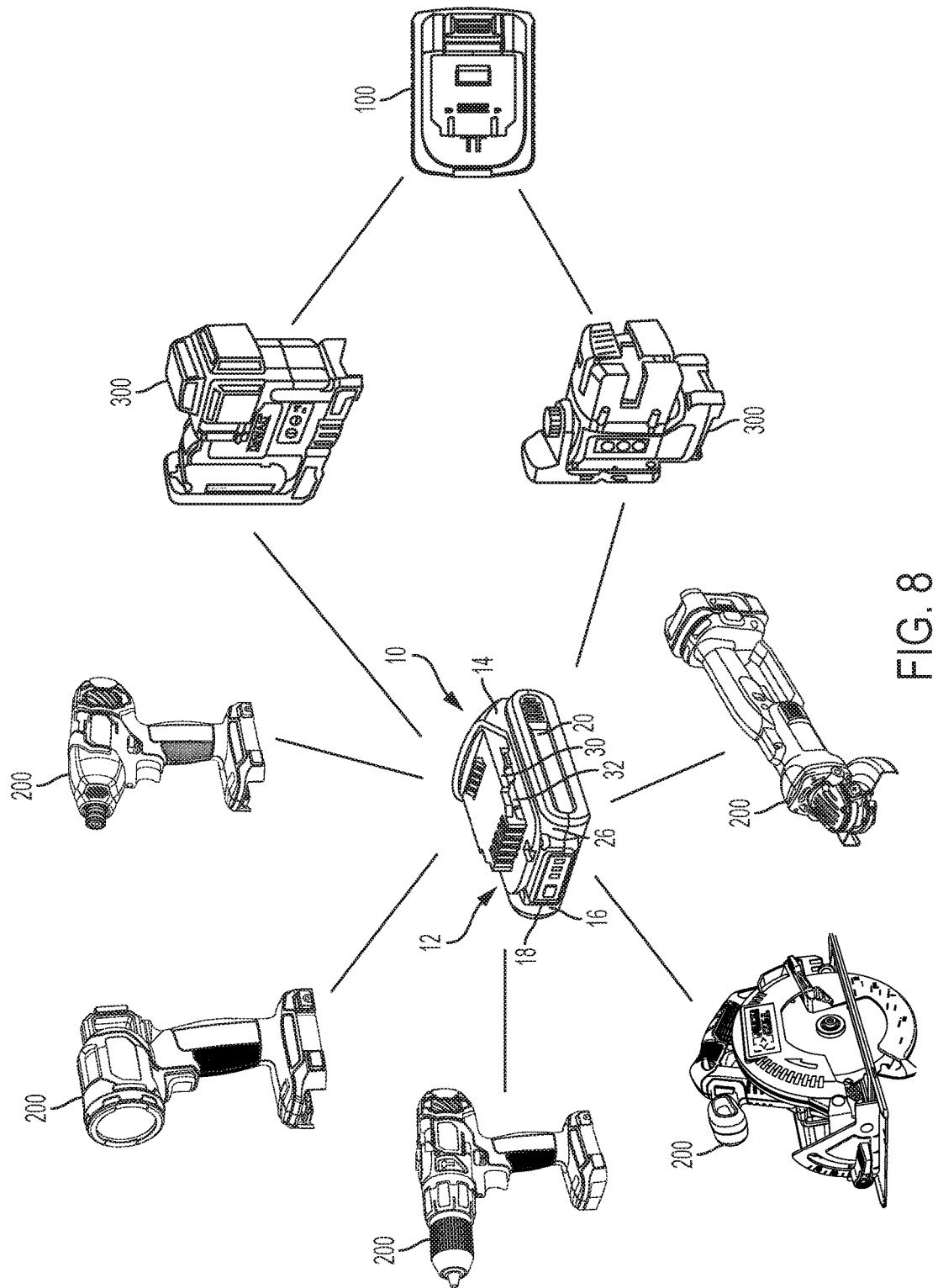
FIG. 8 is an illustrative view of a power tool system according to an exemplary embodiment of the present application.

According to an exemplary embodiment, the present application includes two different battery packs and a system of tools for use with one or both of the battery packs. Such a system is shown in FIG. 8. As shown in FIG. 8, the system includes a first battery pack 10, a second battery pack 100, a first set of tools 200 and a second set of tools 300. The first battery pack 10 is compatible with both the first set of tools 200 and the second set of tools 300 so that it can be coupled to and power both the tools 200 and 300. In contrast, the second battery pack 100 is compatible only with the second set of tools 300. The second battery pack 100 is not coupleable to the first set of tools 200. In the embodiment shown in FIG. 8, the first tools 200 include an impact driver, a flashlight, a drill, a circular saw and a cut-off tool and the second set of tools 300 includes a rotary laser level and a cross-line laser level. U.S. Pat. Nos. 7,481,002, 8,307,562 and 7,296,360 are examples of laser levels which may be part of the first or second set of tools. U.S. Pat. Nos. 7,481,002, 8,307,562 and 7,296,360 are hereby incorporated by reference.

The particular tools in the systems 200 and 300 can vary. For example, the tools 200 or 300 could further include, for example, a screwdriver, hedge trimmer, an edger, a vacuum a sander, etc. Additionally, for example, the flashlight, which is one of the first set of tools 200, could be made part of the second set of tools 300 or one of the lasers could be made as part of the first set of tools 200. Furthermore, there could be one drill which is part of the first set of tools 200 and a second drill which is part of the second set of tools 300. Further explanation of the first battery pack 10 and the second battery pack 100 are below.

FIGS. 1-5 illustrate an exemplary embodiment of the first battery pack 10. The battery pack 10 has a housing 12. The housing 12 may be constructed of plastic or other suitable material for the application. The housing 12 includes a top housing portion 14 and a bottom housing portion 16. The top and bottom housing portions 14, 16 are joined at a horizontal parting line 18. The housing 12 also includes a first side 20, a second side 22, a front 24 and a back 26. The housing 12 is shown with a top and bottom portion. Other alternate configurations may be used to provide the housing for the various other components to be discussed below. For example, the housing could consist of two side housings that are joined at a vertical parting line.

The battery pack 10 includes a connection mechanism 28 for mechanically and electrically coupling the battery pack 10 to a power tool. The connection mechanism 28 includes rails 30 and grooves 32 for a sliding connection with the tool. The tool will include corresponding rails and grooves. The connection mechanism 28 also includes a spring loaded latch 34. The latch 34 will include a portion for receiving a user's finger to depress the latch 34 and a catch feature that will be received in the base of the tool to maintain the battery pack 10 fixed to the tool. The battery pack also includes a terminal block 52 including a plurality of terminals 54 for transmitting current between the battery pack 10 and the tool.

The battery pack 10 may also include a state of charge indicator 36 on the back 26. The state of charge indicator 36 may include an activation button 38 and a plurality of lights 40.

The bottom housing portion 16 includes a bottom surface 42. The bottom surface 42 is configured to include a mesh portion 44. In the illustrated embodiment, the mesh portion 44 extends across most of the bottom surface 42. However, other configurations for the mesh portion 44 are contemplated by this disclosure. The mesh portion 44 includes a grid of holes 46 through the bottom surface 42 of the bottom housing portion 16. The holes 46 extend from outside the housing 12 to a cavity 48 created by the top housing portion 14 and the bottom housing portion 16.

The battery pack 10 includes a plurality of battery cells 50. This particular example illustrates five cells however, more or less cells may be present and the scope of the invention should not be limited to five cells. The cells 50 are typically Li Ion chemistry cells but may be other chemistries.

The bottom housing portion 16 includes an interior bottom surface 56 and first and second bottom housing interior side surfaces 58, 60. The interior bottom surface 56 includes the mesh portion 44 and the holes 46. The interior bottom surface 56 may also include a plurality of cross bars 62. These cross bars 62 may provide the bottom housing portion 16 with structural rigidity.

The battery pack 10 also includes a heat sink 64. The heat sink 64 may, for example, be made of aluminum, zinc or magnesium. The heat sink 64 is preferably constructed of a material that has high specific heat and high heat transfer characteristics. The heat sink 64 has an exterior surface 66 and an interior surface 68. The exterior surface 66 of the heat sink 64 is placed on the bottom housing interior surface 56. The exterior surface 66 of the heat sink 64 may include a lower plurality of recesses 70 which would receive the plurality of cross bars 62 to assist in placing the heat sink 64 on the bottom housing interior surface 56. The heat sink 64 may simply sit on the bottom housing interior surface 56 or may be configured to establish a friction fit between the bottom housing interior side surfaces 58, 60.

The interior surface 68 includes a plurality of concave receiving bays 72. Each bay 72 receives one of the plurality of cells 50. The cells rest on and are in direct contact with the heat sink 64. The interior surface 68 may also includes an upper plurality of recesses 74 which could receive corresponding cross bars 76 of a battery harness 78. The battery harness 78 and the cross bars 76 assist to seat the cells 50 in the heat sink 64.

As current flows from the battery cells 50 to power the tool, heat is generated. Through both convection and conduction heat is transferred from the cells 50 to the heat sink 64. As the temperature of the heat sink 64 increases the heat sink 64 is cooled by the ambient air outside the battery pack 10 via the holes 46 in the mesh portion 44 of the bottom housing portion 16. The size and shape of the holes 46 is selected in order to provide the greatest heat transfer from the heat sink 64 to the ambient air while also providing unwanted access to the heat sink 64 by a user.

When the heat sink 64 is seated in the bottom housing portion 16 adjacent to and abutting the mesh portion 44 and the cells 50 are seated on the heat sink 64 and the top housing portion 14 and the bottom housing portion 16 are fastened to each other, the battery cells 50 are fixed in the cell bays 72 and thermally coupled to the heat sink 64. As a result, the cavity 48 is sealed from the ambient air outside the battery pack 10 and airflow is prevented from moving from the cavity 48 around the heat sink 64, and therefore, most if not all heat transfer from the cells 50 will occur through the heat sink 64 to the ambient air outside the housing 12.

Figure 1:
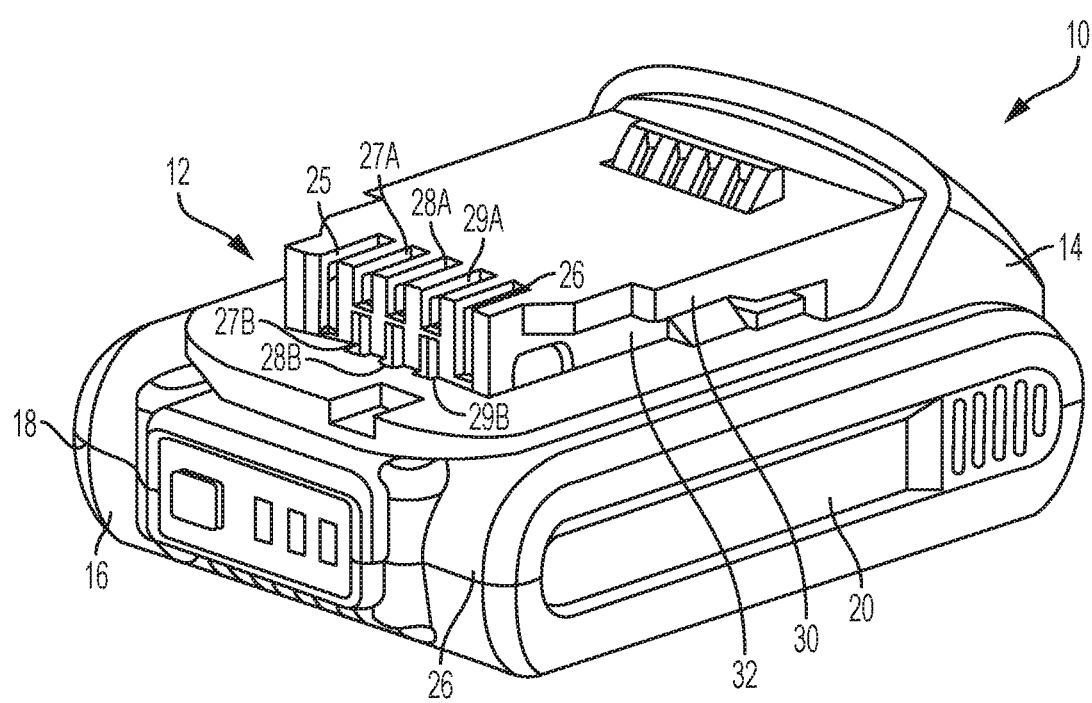
FIG. 1 is a perspective view of an exemplary embodiment of a first battery pack.
Figure 2:
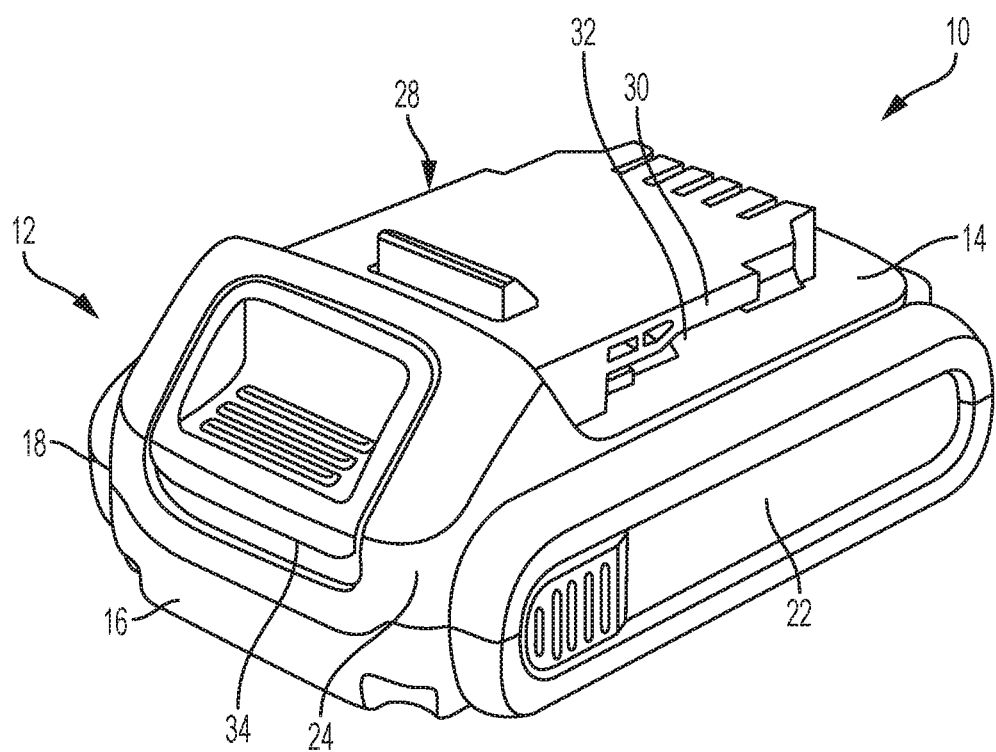
FIG. 2 is another perspective view of the battery pack of FIG. 1.
Figure 3:
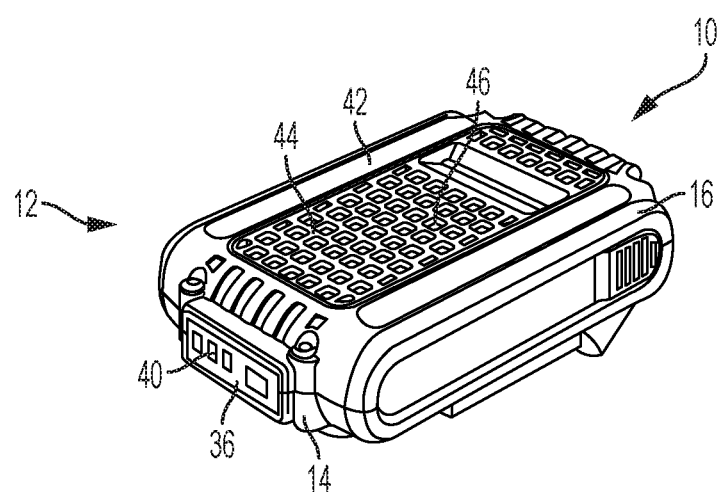
FIG. 3 is another perspective view of the battery pack of FIG. 1.
Figure 4:
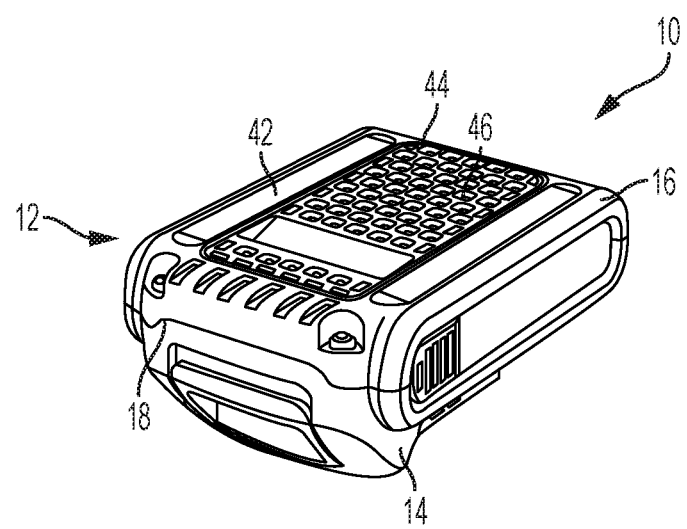
FIG. 4 is another perspective view of the battery pack of FIG. 1.
Figure 5:
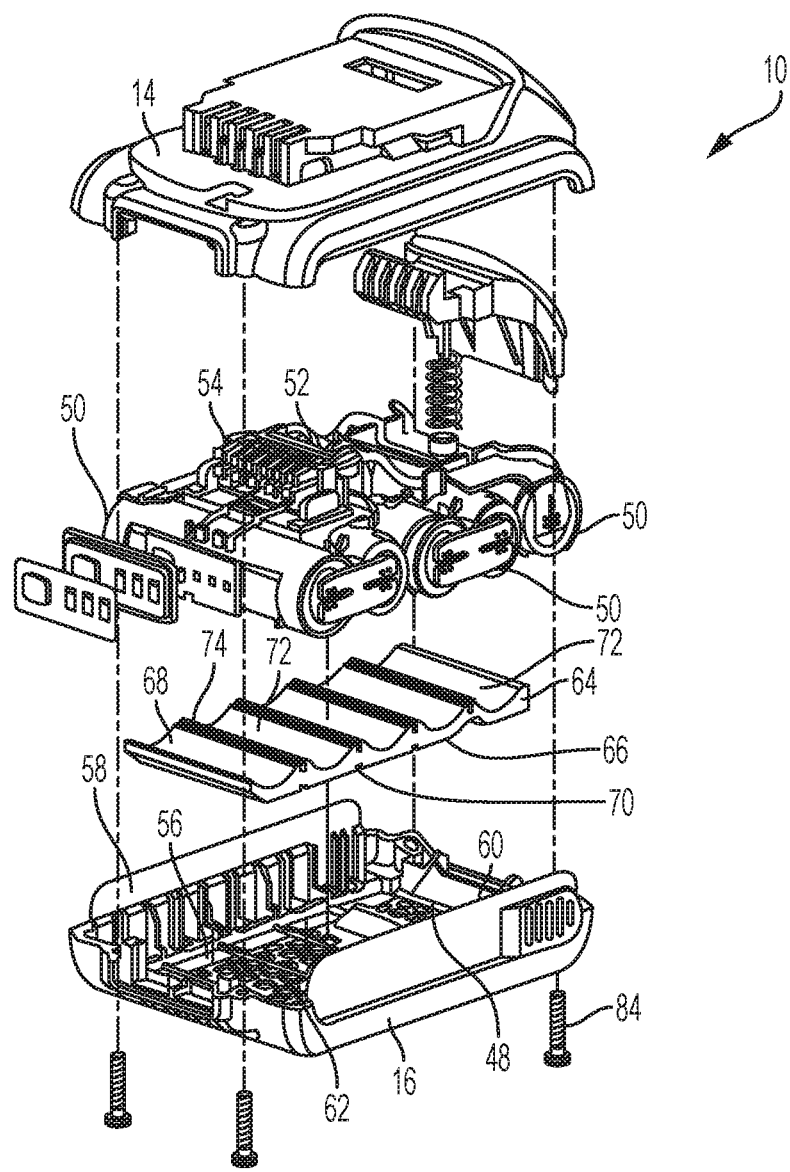
FIG. 5 is an exploded perspective view of various exemplary elements of the battery pack of FIG. 1.

The battery pack of FIG. 1 includes a variety of receptacles 25-29B through which terminals 54 can make a connection with a power tool. Particularly, as shown in FIG. 1, the battery pack 10 includes receptacles 25 and 26 which provide access to terminals 54 through which voltage can be applied to a tool. The battery pack 10 also includes various receptacles 27A, 27B, 28A, 28B, 29A and 29B through which other terminals 54 can be accessed. These terminals may be data transmission terminals, ID terminals, temperature terminals and the like.

Figure 6:
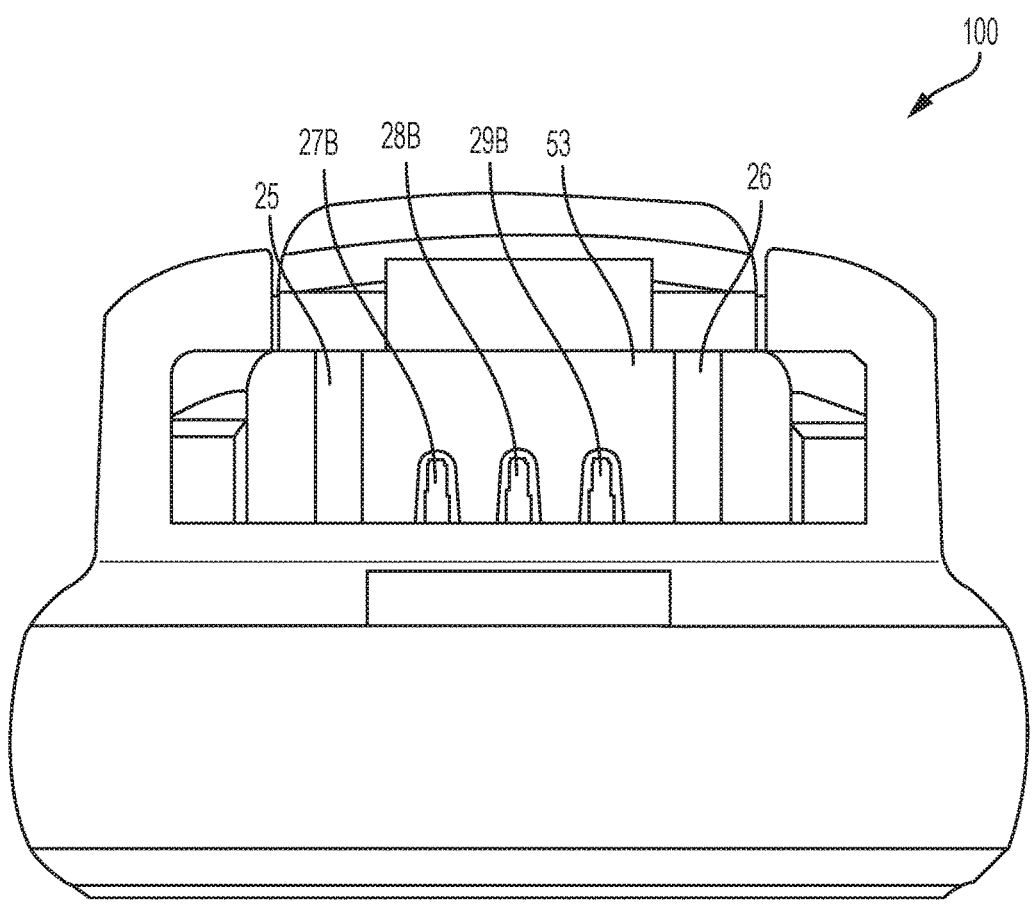
FIG. 6 is a view of an exemplary embodiment of a second battery pack.
Figure 7:
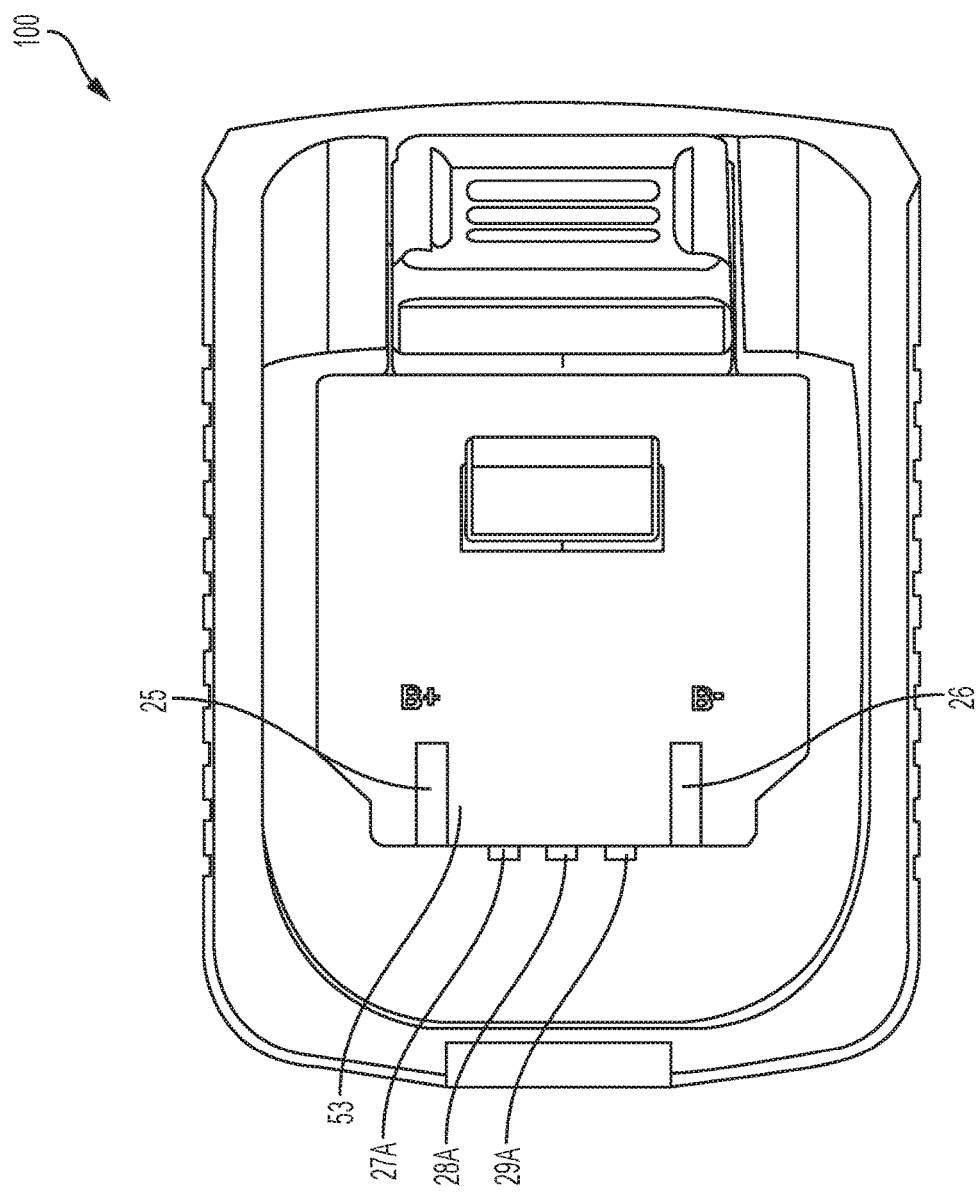
FIG. 7 is another view of the battery pack of FIG. 6.

FIGS. 6 and 7 show a second battery pack 100. The second battery pack 100 is similar to the first battery pack 10 except as otherwise noted. Like the battery pack 10, battery pack 100 includes receptacles 25 and 26 for providing access to terminals 54 for providing electrical power to a tool. The battery pack 100, however, lacks receptacles 27A, 28A and 29A. Instead, the second battery pack has a solid portion 53. The solid portion 53 prevent the second battery pack 100 from being coupled to the first power tools 200, as will be described below in further detail.

Figure 9:
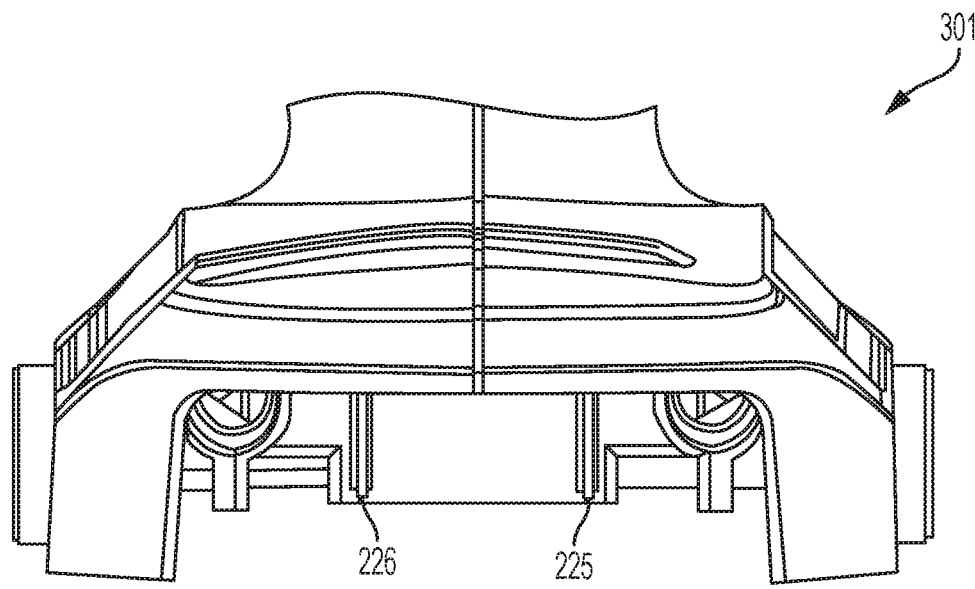
FIG. 9 is a view of an exemplary embodiment of a first tool foot portion.
Figure 10:
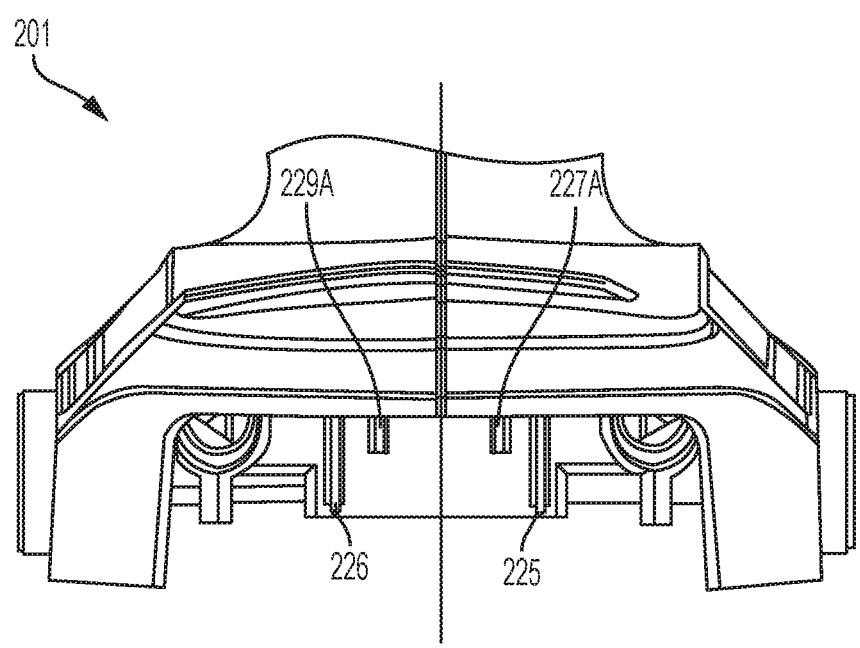
FIG. 10 is a view of an exemplary embodiment of a second tool foot portion.
Figure 11:
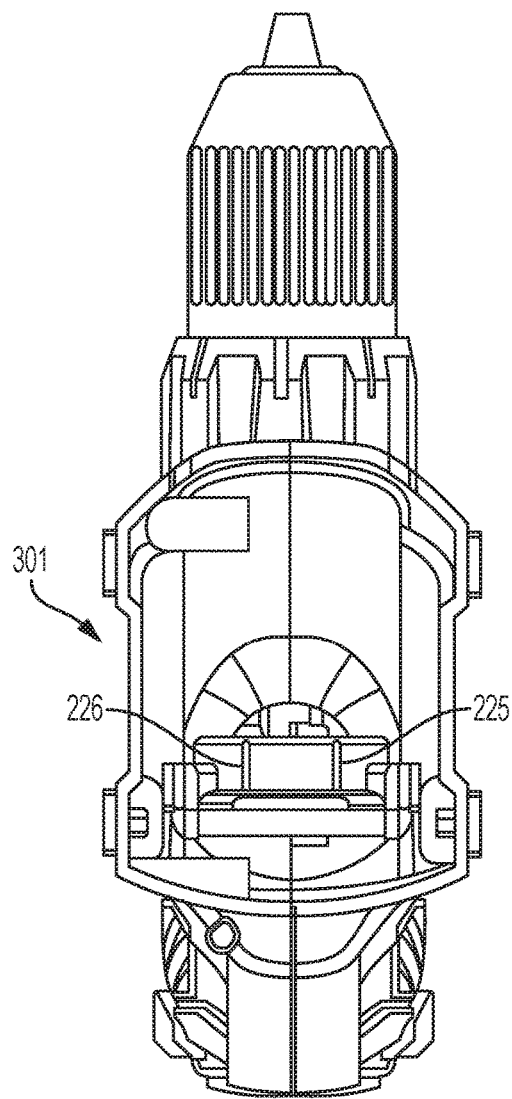
FIG. 11 is another view of the first tool foot portion.
Figure 12:
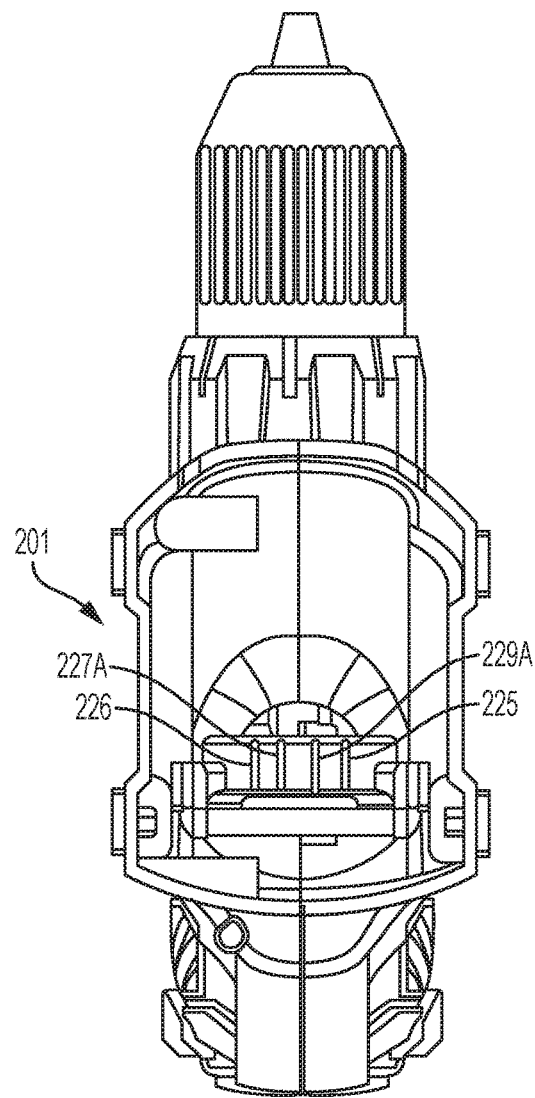
FIG. 12 is another view of the second tool foot portion.
Figure 13:
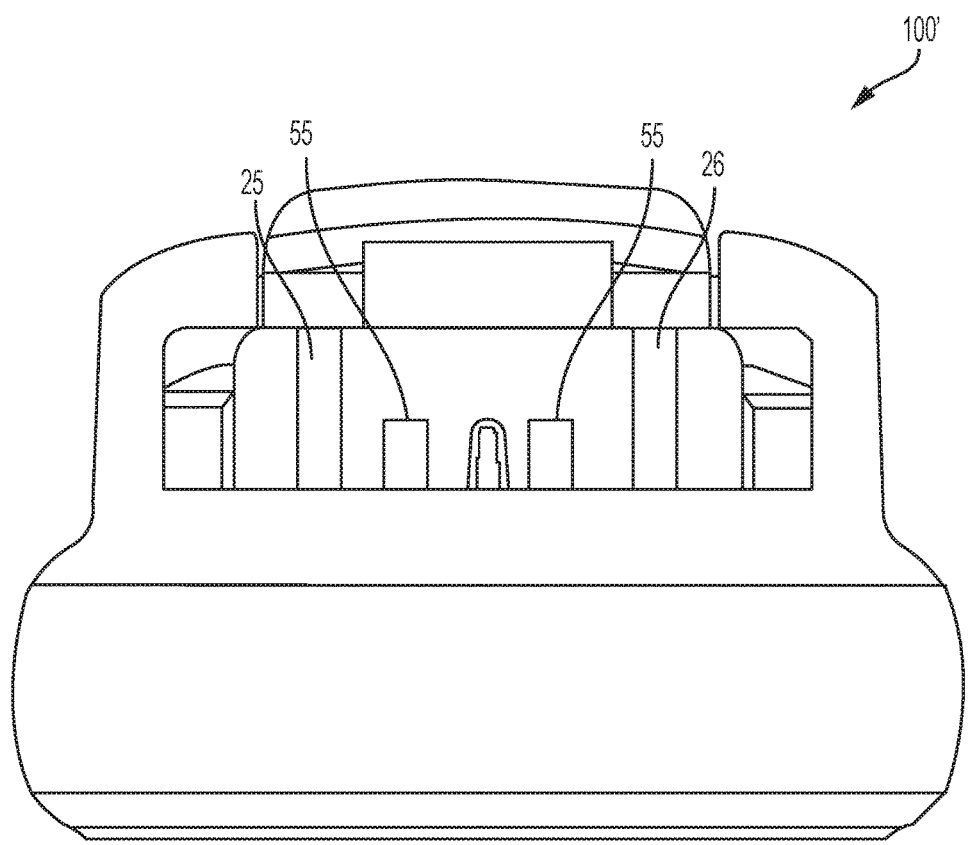
FIG. 13 is a view of another exemplary embodiment of a second battery pack.
Figure 14:
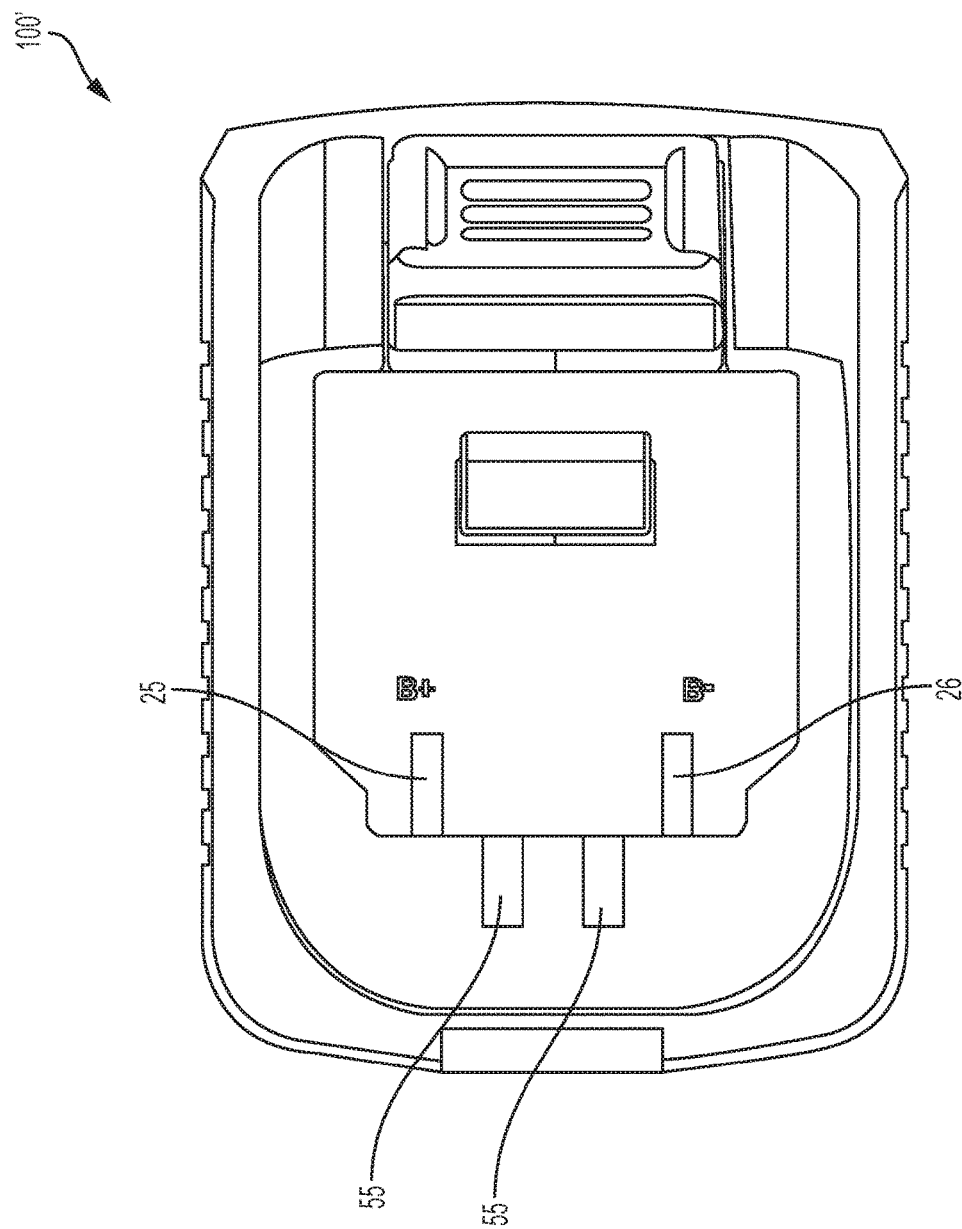
FIG. 14 is another view of the battery pack of FIG. 13.
Figure 15:
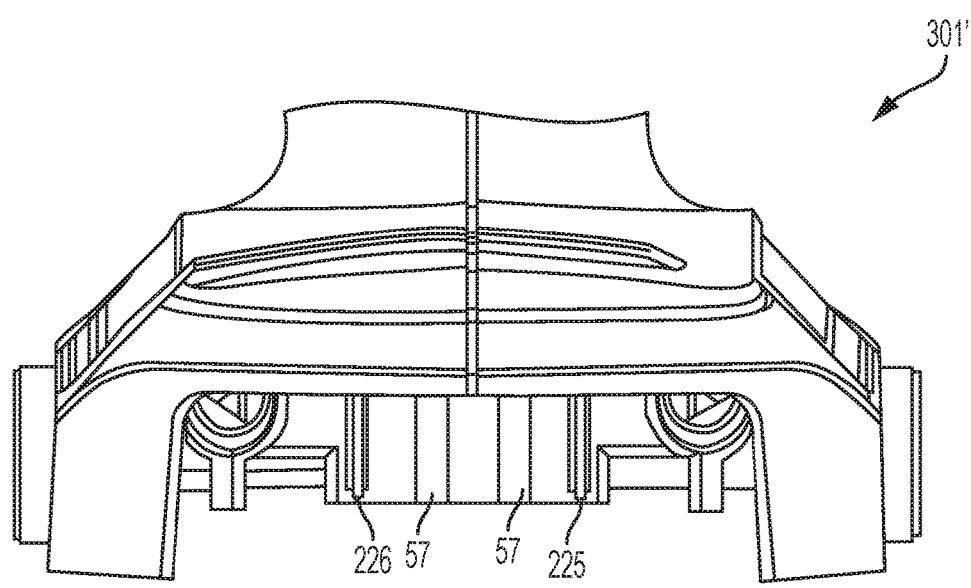
FIG. 15 is a view of another exemplary embodiment of a first tool foot portion.
Figure 16:
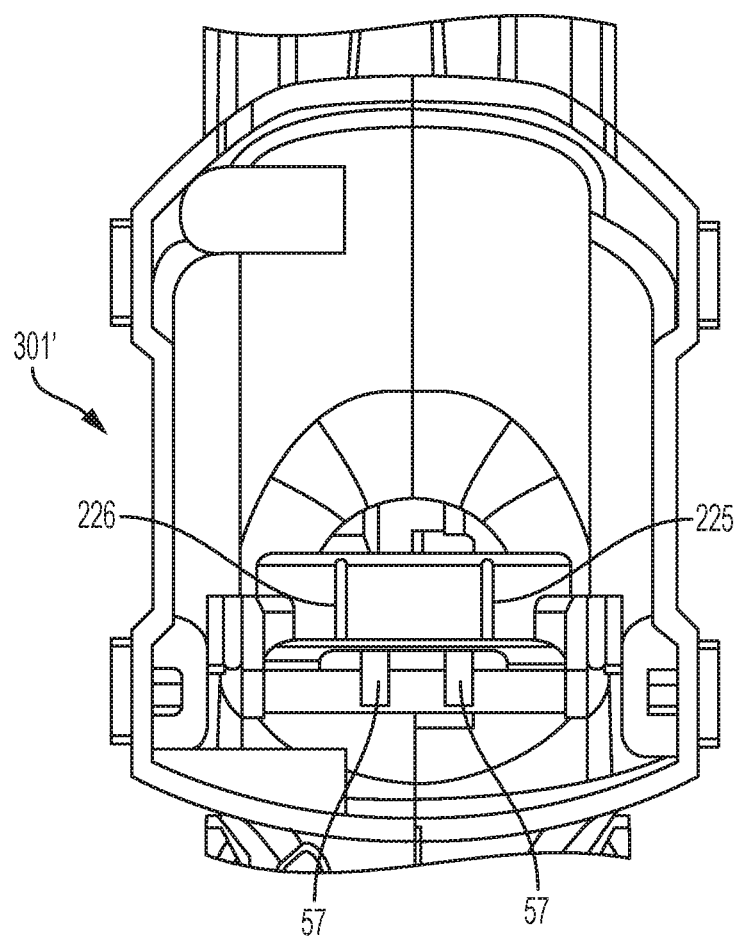
FIG. 16 is another view of the first tool foot portion of FIG. 15.

FIGS. 9-12 illustrate foot portions of the tools of the first and second types. Particularly, FIGS. 9 and 11 illustrate a foot portion 301 for the second type of power tool 300 and FIGS. 10 and 12 illustrate a foot portion 201 for the first type of power tool. The foot portions 201 and 301 are designed to receive and hold a battery pack for powering a tool. As shown in FIGS. 9-12, the foot portions 201 and 301 each include electrical connectors 225 and 226. These electrical connectors line up with the receptacles 25 and 26 so that power (i.e., an electrical voltage) can be supplied from the battery to the power tool. As shown in FIG. 10, the foot portion 201 further includes electrical connectors 229A and 227A. Electrical connector 229A is receivable in the receptacle 29A of the battery pack 10 and electrical connector 227A is receivable in the receptacle 27A of battery pack 10. Accordingly, battery pack 10 is able to mate with a tool having the foot portion 201. Battery pack 10 is also able to be coupled to the tools 300 with the foot portion 301 as the electrical receptacles 25 and 26 of battery pack 10 will receive the electrical connectors 225 and 226 of the foot portion 301. The electrical receptacles 27A-29B will not receive any corresponding tool side electrical connector when connected to a power tool 300 with a foot portion 301, but this will not prevent the first battery pack 10 from coupling to such power tools 300.

Turning to the second battery pack 100, the second battery pack 100 has a solid portion 53 rather than receptacles 27A, 28A and 29A. The second battery pack 100 can be coupled with the second tools 300 with the foot portion 301 because it has receptacles 25 and 26 for receiving electrical connectors 225 and 226. However, the second battery pack 100 is blocked from coupling with the first tools 200 which have additional electrical connectors 229A and 227A because they will be blocked by the solid portion 53. Accordingly, the system of FIG. 8 wherein a first set of tools 200 can receive only a first battery pack 10 and wherein a second set of tools 300 can receive a first battery pack 10 and a second battery pack 100.

FIGS. 13-16 illustrate an alternative embodiment of the second battery pack 100' and second foot portion 301'. In the alternative embodiment of the second battery pack 100', the pack includes blocking projections 55 and the second foot portion 301' includes pockets 57 for receiving the blocking projections 55. In this alternative embodiment, the second foot portion 301' is able to receive the second battery pack 100' with blocking projections 55 because of the pockets 57. The first tools 200 with the first foot portion 200 are not able to receive the alternative second battery pack 100 because they lack such pockets.

The foot portions 201, 301 and 301' may be constructed on any of a variety of battery powered devices such as tools so that such devices may be part of the first set of tools 200 or the second set of tools 300, as applicable.

There are various reasons why it may be advantageous to have a first set of tools 200 which are able to accept only a first pack 10 and a second set of tools which are able to accept a first battery pack 10 or a second battery pack. For example, the first set of tools 200 may have a higher power requirements that are not necessary for the second set of tools 300 and which cannot be provided by the second battery pack. Alternatively, or additionally, a first set of tools 200 may require communication with a battery pack such as can be provided by the first pack 10, but which cannot be provided by the second pack 100. These potential advantages are merely exemplary and the embodiments of this application are not required to have these advantages or features.

The battery packs 10, 100/100' may have battery cells with different chemistries. For example, the battery pack 10 may have battery cells 50 with a lithium-ion chemistry and the battery pack 100/100' may have alkaline cells. Additionally, one of the battery packs may be rechargeable while the other is not. For example, the battery pack 10 may be a rechargeable battery pack while the battery pack 100/100' may not be rechargeable. Alternatively, both battery packs 10, 100/100' may be rechargeable. Additionally or alternatively, the battery pack 100 may include cells which are removable and replaceable while the battery pack 10 may have cells which are not removable and replaceable. Alternatively or additionally, the battery packs 10, 100/100' may have different voltages, capacities, or controls.

What is claimed is:

1. A laser comprising:
   a housing;
   at least one laser generator supported by the housing and configured to emit at least one laser beam;
   a battery receiving portion configured to selectively receive a first battery pack and a second battery pack, the first and second battery packs providing power for the laser generator when received in the battery receiving portion;
   wherein the first battery pack is configured to be coupleable to at least one of a drill, an impact driver, a saw and a sander; and the second battery pack is configured to be blocked from coupling from the at least one of the drill, the impact driver, the saw and the sander to which the first battery pack is coupleable;
   wherein the first battery pack includes first battery cells with a first chemistry;
   wherein the second battery pack includes second battery cells with a second chemistry, different from the first chemistry;
   wherein the second battery cells comprises alkaline cells;
   wherein the first battery pack includes a first set of receptacles for providing access to a first set of terminals;
   wherein the second battery pack includes a second set of receptacles for providing access to a second set of terminals; and
   wherein the first set of receptacles includes a greater number of receptacles than the second set of receptacles.

2. The laser according to claim 1, wherein the first battery pack is configured to be coupleable to the drill and wherein the second battery pack is configured to be blocked from coupling with the drill.

3. The laser according to claim 1, wherein the battery cells of the second battery pack are removable.

4. The laser according to claim 1, wherein the battery cells of the first battery pack are rechargeable.

5. The laser according to claim 1, wherein the first battery pack provides power at a first voltage and wherein the second battery pack provides power at a second voltage, different than the first voltage.

6. The laser according to claim 1, wherein the first battery pack is configured to be selectively coupleable to the drill, the impact driver, the saw and the sander.

7. A laser comprising:
a housing;
at least one laser generator supported by the housing and configured to emit at least one of a dot and a beam outside of the housing onto a remote surface;
a battery receiving portion configured to selectively receive a first battery pack and a second battery pack;
wherein the first battery pack is configured to provide power to the laser generator when the first battery pack is received in the battery receiving portion; and
wherein the second battery pack is configured to provide power to the laser generator when the second battery pack is received in the battery receiving portion;
wherein the first battery pack is additionally configured to be coupleable to a drill, and to provide power to the drill when the first battery pack is coupled to the drill;
wherein the second battery pack is configured to be blocked from coupling to the drill;
wherein the first battery pack includes a first plurality of receptacles which provide access to first terminals on the first battery pack;
wherein voltage is applied to the drill through the first terminals when the first battery pack is coupled to the drill;
wherein the first terminals also include at least one of a data transmission terminal an ID terminal and a temperature terminal;
wherein the second battery pack includes a second plurality of receptacles which provide access to second terminals on the second battery pack;
wherein voltage is applied to the laser generator through the second terminals when the second battery pack is received in the battery receiving portion;
wherein voltage is applied to the laser generator through the first terminals when the first battery pack is received in the battery receiving portion;
wherein at least one of the second terminals and the second plurality of receptacles are configured differently than the first terminals and the first plurality of receptacles; and
wherein there is a different number of the first plurality of receptacles than there is the second plurality of receptacles.

8. The laser of claim 7, wherein the first battery pack provides power at a first voltage; and
wherein the second battery pack provides power at a second voltage, different than the first voltage.

9. A laser comprising:
a housing;
at least one laser generator supported by the housing and configured to emit at least one of a dot and a beam outside of the housing onto a remote surface;
a battery receiving portion configured to selectively receive a first battery pack and a second battery pack;
wherein the first battery pack is configured to provide power to the laser generator when the first battery pack is received in the battery receiving portion; and
wherein the second battery pack is configured to provide power to the laser generator when the second battery pack is received in the battery receiving portion;
wherein the first battery pack is additionally configured to be coupleable to a drill, and to provide power to the drill when the first battery pack is coupled to the drill;
wherein the second battery pack is configured to be blocked from coupling to the drill; and
wherein the first battery pack includes a plurality of first battery terminals and a plurality of first battery receptacles, through which the first battery terminals may be accessed;
wherein the second battery includes a plurality of second battery terminals and a plurality of second battery receptacles, through which the second battery terminals may be accessed;
wherein the first battery receptacles have a different configuration than the second battery receptacles; and
wherein there are more first battery receptacles than second battery receptacles.

10. The laser of claim 9, wherein the first battery pack includes first battery cells with a first battery chemistry, and the second battery pack includes second battery cells with a second battery chemistry, different than the first battery chemistry.

11. The laser of claim 9, wherein the plurality of first battery terminals includes a temperature terminal.

12. The laser of claim 9, wherein the first battery pack includes rechargeable battery cells.

13. The laser of claim 9, wherein the second battery cells are alkaline battery cells.

* * * * *